May 20, 1930.  H. WHITTLE ET AL  1,759,332
WAVE TRANSMISSION CIRCUIT
Filed March 23, 1927   2 Sheets-Sheet 1
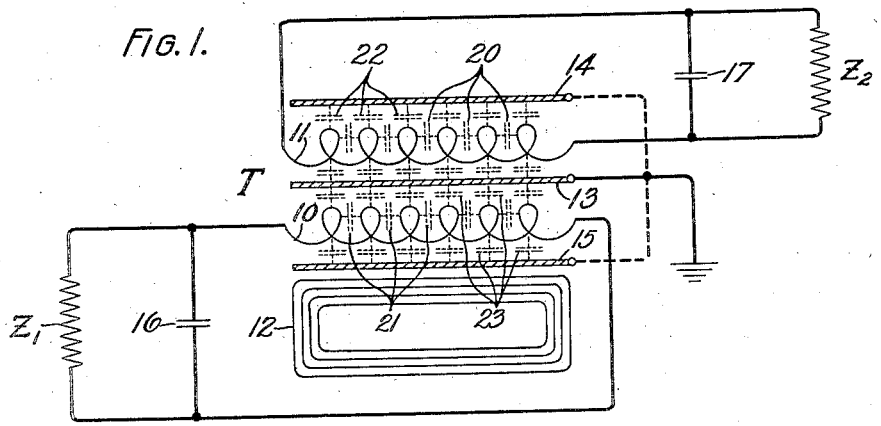
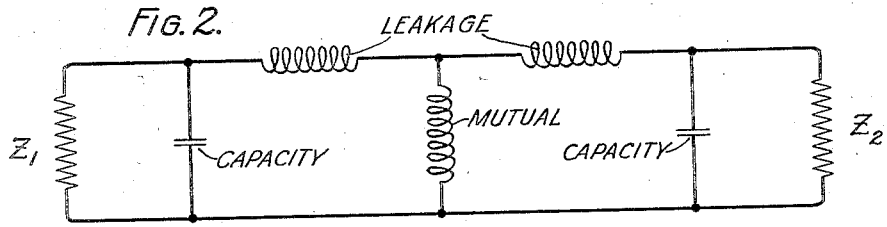
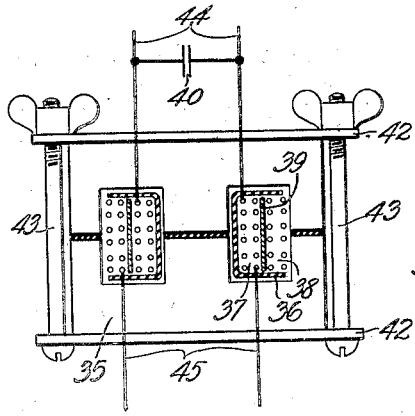
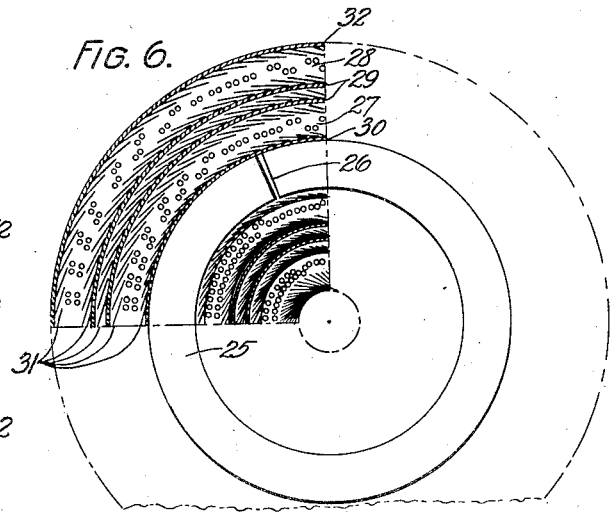
INVENTORS:
HORACE WHITTLE
DONALD G. GRIMLEY
BY  ATTORNEY May 20, 1930. H. WHITTLE ET AL 1,759,332
WAVE TRANSMISSION CIRCUIT
Filed March 23, 1927 2 Sheets-Sheet 2

INVENTORS:
HORACE WHITTLE
DONALD G. GRIMLEY
By W. Griggs
ATTORNEY

Patented May 20, 1930

1,759,332

UNITED STATES PATENT OFFICE

HORACE WHITTLE, OF MAPLEWOOD, AND DONALD G. GRIMLEY, OF RIDGEWOOD, NEW JERSEY, ASSIGNORS TO BELL TELEPHONE LABORATORIES, INCORPORATED, OF NEW YORK, N. Y., A CORPORATION OF NEW YORK

WAVE TRANSMISSION CIRCUIT

Application filed March 23, 1927. Serial No. 177,518.

This invention relates to electrical transmission and particularly to the control of the phase shift or phase transformation of different frequency components incident to the transmission of electrical currents or waves through electrical transmission elements such as transformers and the like.

The invention has particular reference to systems or apparatus employing currents or waves comprising a range of frequencies such as is the case usually in signaling or in the recording or reproduction of sounds.

An object of the invention is the control of the phase displacements or phase shifts which take place at different frequency levels of the transmitted waves or currents; particularly so that variations of the phase shift with frequency throughout a given frequency range may be kept small or may be increased as desired.

In certain situations it has been found necessary or desirable to maintain the phase shift occurring in the circuit between predetermined limits within a certain frequency range. It has been found, for example, that a distortion which is very objectionable for certain kinds of work is produced when the phase shift variation throughout a given frequency range exceeds a given amount. In order to avoid excessive phase shift variations, it is frequently desirable to construct a transmission element which will have a practically zero or very small variation in phase shift throughout the total range of frequencies to be transmitted. In other typical cases it is desirable to construct a transmission element which may be required to match the phase distortion of another or other elements of the circuit so that when their effects are opposed they will give an overall phase shift variation which is zero or small for the required frequency band. In the latter case the required phase shift variation may need to be large throughout the given frequency band and will in general need to duplicate closely the phase shift characteristic of the other transmission element or elements.

A particular object of the invention is to control the factors which influence the phase shift variation with frequency in a transmission element such as a transformer or the like, so that the element shall possess a desired or required phase frequency characteristic.

In carrying out the object of this invention it has been found that the phase shift of a transmission element can be controlled by proportioning one or more of the following four factors with respect to the others: (1) mutual impedance, (2) leakage impedance, (3) shunt capacitive impedance and (4) the effective series capacitive impedance of the circuit to which it is connected.

The invention will be specifically disclosed as applied to and embodied in a transformer or repeating coil type of transmission element, and reference is made to the detailed description to follow for a complete understanding of the manner of construction and mode of operation of such an embodiment. It is to be understood that the broad aspects and essential features of the invention are to be pointed out and defined in the claims.

Reference will now be made to the attached drawings forming a part of this specification. In this drawing Fig. 1 is a schematic representation of a transformer in a general type of circuit in which it may be employed.

Fig. 2 is the well known T equivalent of the circuit of Fig. 1.

Fig. 6 shows an embodiment of the invention in a toroidal type transformer while Fig. 7 shows an embodiment in a transformer of the shell type.

Figure 3:
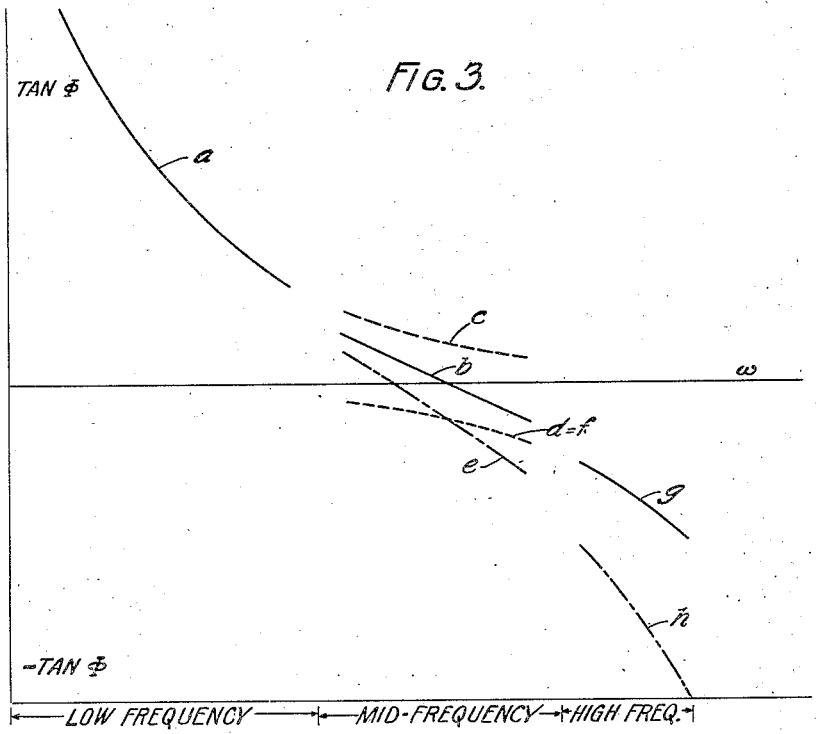
Figs. 3, 4 and 5 are curves illustrating the effect of the transformer and circuit constants on the phase shift frequency characteristic.

Referring specifically to Fig. 1, $Z_1$ represents the impedance of the input of transformer T, this impedance being either the output side of another transformer, the impedance of the plate circuit of a vacuum tube, or of a radio antenna system, or of a transmission line or other circuit. $Z_2$ represents a load impedance of the transformer T which may be reactive, capacitive or a pure resistance depending upon the predominating constants of the load. As in the case of $Z_2$, this output impedance may take on different forms, such as the impedance of a telephone line, or of the grid circuit of a vacuum tube or other load circuit. The transformer T comprises primary winding 10 and secondary winding 11. These windings may be disposed on a core 12, the core being of a material consistent with the principles to be described later. A shield 13 is employed between windings to prevent longitudinal currents in the input circuit from being repeated in the secondary winding. A shield 14 may be disposed around the core and a shield 15 around the entire coil. These shields may or may not be grounded as indicated by the connecting dotted lines. Condensers 16 and 17 may be shunted across the primary and secondary windings respectively to control the phase shifting properties of the transformer as will be described hereinafter.

It is well known in the transformer art that a certain amount of capacity exists between the windings of transformers and between the individual turns of these windings. This distributed capacity is represented by the dotted condensers 20 for the secondary winding 11 and for the primary winding 10 by the dotted condenser 21. The inherent capacity between the windings and the shields 13, 14 and 15 is represented by the dotted condensers 22 for the winding 11 and by condensers 23 for the winding 10. The effect of these capacities on phase shift and their method of control will be described later.

Referring to Fig. 2, the leakage inductance of the transformer T is shown by the series coils, while the mutual inductance is shown by the shunted coil. As is well known in the art, the equivalent T network for a transformer of non-unity impedance ratio would need to take account of this ratio, but for simplicity in the case of Fig. 2 a unity ratio is assumed, it being understood of course that the invention is not limited to unity ratio elements. The condensers designated as capacity may be either wholly or partly distributed capacity or partly furnished by external condensers such as shown in Fig. 1 as 16 and 17. These three factors, leakage impedance, mutual impedance and shunt capacity, are present in transmission elements such as transformers, each factor having an influence on the phase shift frequency characteristic of the element, as does also the series capacity if any. The effect of varying the values of the constants of the transformer circuit will be explained in connection with the curves in Figs. 3, 4 and 5.

The effect of the four factors above mentioned will be set forth in relation to their effect upon the tangent of the phase shift angle (tan $\phi$). While the phase shift angle might be defined in different ways depending on the viewpoint it will be sufficient for the present disclosure to consider the angle of phase shift as the difference between the angle of the received voltage when the transformer or other element is out of the circuit and the angle of the received voltage when the element is inserted in the circuit. This definition is given in the interest of clearness in the terms to be employed in the description, but is not to be construed as limiting the scope of the invention.

Tan $\phi$ varies inversely as the mutual reactance, that is, inversely as $2\pi fL$.

Tan $\phi$ varies directly as the leakage reactance $2\pi fL$ and the angle is in the opposite direction to the effect of the mutual.

Tan $\phi$ varies directly as $2\pi fC$ or inversely as the shunt capacitive reactance and is in same direction as that due to leakage.

Tan $\phi$ varies directly as the series capacitive reactance $\frac{1}{2\pi fc}$. This quantity, therefore, has an effect analogous to that of the mutual reactance.

Referring now to Fig. 3 curves are shown which give, for an assumed transformer realizable in practice, the relationship between tan $\phi$ and frequency over a considerable frequency range. For convenience this frequency range has been divided into three ranges, namely, low frequency range, mid-frequency range and high frequency range. The series capacity factor has been omitted from these curves since this quantity more usually occurs in the external circuits of the transformer, but its curve would be identical with curve $a$. At the lower frequencies the phase shift is substantially determined by the mutual inductance as shown by curve $a$ which gives the effect of the mutual inductance on the relation between tan $\phi$ and frequency. This is for the reason that at low frequencies the leakage and shunt capacity effects are nearly zero as shown by the curve $d$ which has been drawn only in the mid-frequency range since this quantity approaches closely to the zero axis in the lower frequency range. The curve $b$ in the mid-frequency range shows the resultant for the case where the principal factors are mutual and leakage reactances while the curve $e$ shows the resultant where the factors are mutual, leakage and shunt reactances, this curve being obtained by adding curve $c$ to twice the curve $d$. The curve $d$ extended to the high frequency range becomes the curve $g$ and similarly the curve $e$ becomes the curve $h$ in the high frequency range as in the case of the curve $a$ becoming the curve $c$ in the mid-frequency range.

No scale has been given for the frequency range and since the assumed scale is logarithmic any actual frequency limits may be assigned to it. Of course, if the mid-frequency is 100 cycles the actual transformer design will be different from the case where the mid-frequency is 100,000 cycles but the shape of the curves will be the same for both cases, other things being equal, since for the same phase shift the various reactances are the same no matter what the frequency may be.

As stated above the curves of Fig. 3 are general in that they refer to any frequency range over which it may be desired to operate and they show the general shape of the phase shift characteristic in a relative or qualitative rather than in a quantitative manner. If a desired phase shift characteristic is to be realized within explicit frequency limits, the transformer is to be designed so that the frequency range falls between desired points on these curves. In many cases, however, merely choosing in effect a given portion of the curves as indicated in Fig. 3 will not suffice. For example, it may be desirable to obtain not only a curve of desired steepness but of a different shape from any of the curves of Fig. 3 in the region where these curves have the required steepness.

Applicants have discovered that the constants which principally determine the shape and the steepness of the different portions of the curves, of which Fig. 3 may be taken as typical, can be controlled, within limits, to combine in effect different portions of these curves at will so as to provide a resultant phase shift characteristic of the desired shape and steepness. It is pointed out above that at the lower frequencies the phase shift is largely determined by the mutual inductance while at the higher frequencies the mutual inductance has relatively negligible or small effect, the leakage inductance and shunt capacity being the principal factors in the high frequency range. It is possible to change the mutual without appreciably affecting the leakage and shunt capacity and vice versa so that at any given frequency level relatively steep or relatively flat portions of the different curves may be made to overlap to give a desired resultant characteristic.

Figure 4:
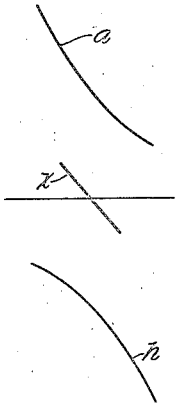

Suppose, for example, that it is desired to construct a transformer which will have a relatively steep and approximately straight phase shift characteristic as indicated by the line $x$ of Fig. 4. Referring to the curves of Fig. 2 it will be seen that the curve $a$ for the mutual impedance is steepest in the low frequency range while the curve $g$ for the leakage reactance or shunt capacity is steepest in the high frequency range and, moreover, these two quantities differ in sign so that when they are combined in one and the same structure so that they are effective within the same desired frequency range, they will quantitatively subtract and give a resultant steep curve which may be made substantially linear. In order to make the curves overlap in the desired frequency region, it may be sufficient, depending on the frequency range, to produce a relative shift in the two curves $a$ and $g$ by shifting one or both of these curves, these two curves being selected by way of example for the purpose of illustrating the assumed case. The curve $a$ will, in effect, be moved to the left, that is, toward the lower frequency range if the mutual is increased and conversely, will be moved to the right, that is, toward the higher frequencies, if the mutual is decreased. Suppose that the mutual reactance is decreased so that the curve $a$ is moved to the right, then for any given frequency level, a steeper portion of the curve is brought to that level. By increasing the leakage or the shunt capacity the curve $g$ may be moved to the left and by decreasing these quantities, it may be moved to the right. If both the leakage and the shunt capacity are changed, the summation curve $e$ or $h$ behaves similarly. Consequently, if such a relative shift in the curves $a$, $e$, $g$ or $h$ is made, as indicated in Fig. 4, so that the steep portions of these curves are made to overlap in the frequency region, the resultant phase shift characteristic is obtained.

Figure 5:
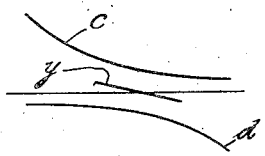

If, on the other hand, a small phase shift is desired, such as indicated by curve $y$ in Fig. 5, the curves are manipulated so that relatively flat portions are made to overlap throughout the desired frequency range. This may be done by increasing the mutual which, in effect, moves the curve $a$ to the left and by decreasing the leakage or shunt capacity which, in effect, shifts the corresponding curves to the right.

In practicing the invention any one of several known types of structure may be employed, and in addition to the transformer per se, such factors as additional inductances, capacity and resistance may be used. In designing a transformer to have a desired phase shift characteristic, it is to be noted that there are certain factors which affect all of the transformer constants in the same manner so that they have little, or any, influence on the shape of the phase shift frequency characteristic but serve to locate the curves of Fig. 3 as to absolute frequency level. Among these, for example, are such factors as the number of turns, the physical dimensions of the transformers, etc. There are other factors, however, which affect the mutual impedance, the leakage impedance, and the shunt capacity to a considerable extent independently of one another. Among the latter factors may be mentioned the following, by the way of example.

1. If the mutual impedance is to be influenced substantially independently of the leakage impedance and the shunt capacity, the core characteristics may be changed without changing the space occupied by the windings or the other dimensions. For example, in designing a transformer to have a desired phase shift characteristic the core may be made of high permeability to give relatively large mutual and low permeability to give relatively low mutual. The mutual may be reduced by introducing an air gap in the core or making a gap filled with a material of lower permeability than the rest of the core. Also the mutual may be changed by changing the number or size of the laminations which, in effect, changes the permeability. Where the core is made of lamination sections or other sections forming a butt joint, a convenient method of controlling the mutual is to control the clamping pressure of the sections together thus, in effect, controlling the air gap.

2. If the shunt capacity is to be changed independently of the other mentioned quantities, this may be increased by adding a shield over the inner windings or over the outer windings where the primary and secondary windings are superimposed. The shunt capacity may also be increased by making the windings of a parallel pair suitably connected together from the circuit standpoint. If a shield is provided between the inner winding and the core, the capacity may be decreased by using a spacer of insulating material between this shield and the windings. A further means of varying the capacity is by changing the size of the wire and its insulation.

3. To control the leakage independently of the other mentioned quantities two shields may be used between the two superposed windings and separating material in the form of insulation may be used between these two shields in order to separate the windings. Separating material so placed has little or no effect on the capacity, whereas if separating insulating materials are used between the shield and a respective winding, then the shunt capacity is reduced. Where an air gap in the core is employed, an effective way of varying the leakage is to vary the distribution of the windings on the core in the neighborhood of the gap. For example, concentrating the turns at a distance away from the gap while keeping the total number of turns the same has been found to increase the leakage as much as 300% in a given case where a gap was used in a particular core. The leakage may also be controlled by using a number of non-inductive turns spaced a considerable distance from each other along the core.

In addition to the above methods of controlling what may be termed the inherent constants of the transformer, there may be added to the circuit lumped reactances, such as series inductance or series capacity, or shunt reactance which may be variable.

In Fig. 6 the invention is shown embodied in a toroidal core coil of a type in which variations in the constants above discussed may be made within relatively wide limits by controlling inherent properties in the transformer. This type of transformer is capable of design to have either a very flat and practically zero phase-shift-frequency characteristic or a relatively steep phase-shift-frequency characteristic in accordance with the principles of the present invention.

Referring to the structure of the coil, the core 25 has an air gap 26, which may be varied within wide limits. Overlaid on the core is a shield 30, over which is a layer of insulation. Then comes the primary winding 27, next a shield or a pair of shields 29 with insulation 31 between them to space them apart, then the secondary winding 28, and finally the outer shield 32. Where a pair of shields 29 is used between the windings the shields are made in split halves overlapping to provide effective shielding without making a short-circuited turn. By referring to the numbered paragraphs given above, the effect on the phase-shift may be seen of varying the different constructional features of the transformer.

In an actual case a transformer of this type built to have a very flat, practically zero, phase-shift-frequency characteristic over the frequency range of 40,000 to 70,000 cycles per second was constructed as follows: The core 25 was composed of a nickel-iron-chromium alloy heat treated to have high permeability at low magnetizing forces, such for example, as the core disclosed in U. S. Patent 1,586,883 to G. W. Elmen dated June 1, 1926. Each winding consisted of a single layer wound uniformly over the core. The primary winding consisted of 160 turns of double cotton covered copper wire of B. and S. gauge No. 31 and the secondary of 80 turns of the same kind and size of wire. The primary was wound as a parallel pair, in this particular case to provide a center tap for the winding. Only one shield was used, this being between the two windings. The windings were located about 0.002 inch apart, this distance representing the thickness of the shield and an insulating covering on each side thereof. The effective mutual inductance of this particular coil was 0.036 henry, the effective leakage inductance was 0.000075 henry, and the effective shunt capacity was 300 mmf. The phase shift variation between the two frequency limits above given was of the order of 2½ degrees, extending between about 2 and 4½ degrees at the lower and upper frequency limits respectively. The shape of the phase characteristic was substantially linear between these two points. The use of the parallel pair referred to in this instance was required for circuit reasons, as stated. If both windings had been made with a single conductor the phase-shift could, of course, have been made even smaller.

The same type of coil constructed to have a larger phase-shift and steeper characteristic had the following constructional features:

The core was of silicon steel. The inner winding consisted of 84 turns of B. and S. gauge No. 22 enamel and single silk covered wire wound in two complete layers. The outer winding comprised 100 turns of the same kind and size of wire. Both windings were made of parallel pair. Shields were used as shown in Fig. 6, that is, next to the core, between windings and over the entire coil. The inner winding was at a distance of about 0.002 inch from the core. Insulation of about 0.001 inch separated the two parts of the intermediate shields (29 in Fig. 6). Each winding was separated about 0.003 inch from the intermediate shield. Another layer of insulation of about 0.001 inch was placed between the outer winding and outer shield. This coil had an effective mutual inductance of 0.0072 henry, an effective leakage inductance of 0.0007 henry and an effective distributed capacity of 1000 mmf. The variation in phase-shift between the same frequency limits was of the order of seven degrees, extending from about three to ten degrees at the lower and upper frequency limits respectively.

Fig. 7 shows an embodiment of the invention in a shell type transformer. The core 35 consists of laminations made of two equal E-shaped sections facing each other and clamped together by clamps 42 and bolts 43. The pressure exerted on these core sections can be varied by this clamping means and this permits a variation to be readily made in the effective air gap. The air gap may contain a separator as shown. The windings are both placed on a spool 36 on the center limb of the core, and one or more shields 39 may be placed between the windings. Leads 44 extend from the primary 37 and leads 45 connect to the secondary 38. If desired, external capacities may be connected to one or both pairs of leads. In the drawing one such capacity 40 is shown connected across winding 37.

In an actual case a transformer of the type shown in Fig. 7 had the following dimensions. The requirement was to provide a substantially straight-line phase-shift-frequency characteristic extending between about 14½ degrees and 23 degrees for the frequency range from 45,000 to 65,000 cycles per second. This transformer had a core composed of laminations 14 mils in thickness of E-shaped sections butt-jointed as in Fig. 7. The windings were placed on an insulating spool of about $\frac{1}{16}$ inch thick. The primary winding consisted of two sections in series each containing 44 turns, with the secondary in a single section lying between the two primary winding sections, in superposed relation. Both windings consisted of B. and S. gauge No. 34 enamel and single cotton covered wire. Both windings were made up of twisted pair. A shield was used between each two sections of winding and in each instance the separation between winding and shield was of the order of 0.001 inch. This coil had an effective mutual inductance of 0.012 henry, an effective leakage inductance of 0.0006 henry, and an effective capacity of 1100 mmf., the principal portion of which consisted of an external condenser connected across the terminals of each winding.

The use of twisted pair in this coil increased the distributed capacity over what it would have been if the wires had not been twisted. Interleaving the secondary winding in the manner described in this coil gave closer coupling by lowering the leakage.

The coefficient of coupling is defined as the ratio of the mutual inductance to the square root of the product of the primary and secondary self-inductances. For perfect coupling the coefficient is unity.

Iterative networks of the prior art for obtaining larger phase-shift for the purpose of delaying transmission employ zero or very small coupling. Applicants' invention may be practised with transformers which have close coupling and which are efficient as regards transmission. In the actual transformers whose dimensions are given above, coefficients of couplings were used well in excess of 90%, in typical cases being of the order of 98%.

The phase-shift of a device such as a transformer may be readily determined by the phase shift measuring circuit or method disclosed in application for patent of W. P. Mason, Serial No. 112,598 filed May 29, 1926, which became Patent 1,684,403, September 18, 1928.

The invention has been described with particular reference to transformers or repeating coils for giving a required phase-shift or phase-shift variation. The invention is not to be limited by the specific types of transmission devices that have been illustrated or described, nor by the constructional examples that have been given as illustrations, but the scope of the invention is defined in the claims.

What is claimed is:

1. A transmission device in which transmission takes place through said device principally by mutual induction between elements of the device, said device having at least one of the constants: mutual impedance, leakage impedance and shunt capacity, proportioned with respect to the other-mentioned constants and with respect to the rate and direction of change of phase with frequency of waves transmitted by said device as determined by the said respective constants to give the device substantially minimum phase-shift distortion for a range of frequencies to be transmitted.

2. A structure for repeating waves of a band of signal frequencies, said structure comprising a transformer having a proportionment between a constant influencing the phase shift variation in one direction from the point of zero phase shift and a constant influencing the phase shift in the opposite sign, such as to minimize the distortion of the transmitted signals due to phase-shift-frequency variation throughout the transmitted frequency range.

3. A transformer having two mutually related circuits including a winding disposed on a core, for use in a system transmitting currents of a wide frequency range, capacity effectively in shunt to at least one of said circuits, whereby said transformer has mutual impedance, leakage impedance and shunt capacity, at least one of said quantities being proportioned relative to at least one other of said quantities and with respect to the rate and direction of change of phase with frequency of waves transmitted by said device as determined by the said respective constants, to cause the structure as a whole to provide a substantially minimum over-all phase distortion in said system for the range of frequencies transmitted.

4. A transformer according to claim 3 in which the coefficient of coupling between said two circuits is in excess of 50%.

5. A transformer according to claim 3 in which the coefficient of coupling between said two circuits is in excess of 90%.

6. A transformer for use in a system transmitting waves of a wide range of frequencies, said transformer having an impedance ratio greater than unity and intercoupling two circuits having different impedances, the system comprising said circuits and said transformer having, when the transformer is connected to said circuits, effective mutual impedance, leakage impedance and shunt capacity, certain of the said quantities being proportioned with respect to the others and with respect to the rate and direction of change of phase with frequency of the transmitted waves as determined by the said respective constants to give the system as a whole a substantially minimum phase distortion for the transmitted waves.

7. A transformer for use in a system transmitting waves embracing a wide band of frequencies, said transformer having certain of its constants: mutual impedance, leakage impedance and shunt capacity, proportioned with respect to the others to give the transformer a phase-shift-frequency characteristic throughout the frequency range transmitted such as to compensate the phase distortion of said waves by said system.

In witness whereof, we hereunto subscribe our names this 17th day of March, A. D. 1927.

HORACE WHITTLE.
DONALD G. GRIMLEY.